US011589183B2

(12) United States Patent
Tu et al.

(10) Patent No.: US 11,589,183 B2
(45) Date of Patent: Feb. 21, 2023

(54) INERTIALLY STABLE VIRTUAL AUDITORY SPACE FOR SPATIAL AUDIO APPLICATIONS

(71) Applicant: Apple Inc., Cupertino, CA (US)

(72) Inventors: Xiaoyuan Tu, Sunnyvale, CA (US); Margaret H. Tam, San Jose, CA (US); Alexander Singh Alvarado, San Jose, CA (US); Johahn Leung, San Francisco, CA (US); Simon Woollard, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/351,199

(22) Filed: Jun. 17, 2021

(65) Prior Publication Data

US 2021/0400420 A1    Dec. 23, 2021

Related U.S. Application Data

(60) Provisional application No. 63/041,898, filed on Jun. 20, 2020.

(51) Int. Cl.
*H04S 7/00* (2006.01)
*G06F 3/01* (2006.01)
*H04S 3/00* (2006.01)
*H04R 5/033* (2006.01)

(52) U.S. Cl.
CPC .............. *H04S 7/304* (2013.01); *G06F 3/012* (2013.01); *H04R 5/033* (2013.01); *H04S 3/008* (2013.01); *H04S 2400/01* (2013.01); *H04S 2400/11* (2013.01)

(58) Field of Classification Search
CPC ...... H04S 7/304; H04S 3/008; H04S 2400/01; H04S 2400/11; G06F 3/012; H04R 5/033
USPC ........................................................ 381/303
See application file for complete search history.

(56) References Cited

U.S. PATENT DOCUMENTS

| 9,459,692 | B1 | 10/2016 | Li |
| 10,339,078 | B2 | 7/2019 | Nair et al. |
| 2005/0281410 | A1 | 12/2005 | Grosvenor et al. |
| 2014/0153751 | A1* | 6/2014 | Wells ............... H04S 7/304 381/74 |
| 2016/0119731 | A1 | 4/2016 | Lester, III |
| 2016/0269849 | A1 | 9/2016 | Riggs et al. |
| 2017/0295446 | A1 | 10/2017 | Thagadur Shivappa |
| 2018/0091923 | A1 | 3/2018 | Satongar et al. |

(Continued)

*Primary Examiner* — Paul Kim
(74) *Attorney, Agent, or Firm* — Fish & Richardson P.C.

(57) ABSTRACT

During an initialization of a head pose tracker for a spatial audio system, a spatial audio ambience bed is rotated about a boresight vector to align the boresight vector with a center channel of the ambience bed. The boresight is computed using source device motion data and headset motion data. The ambience bed includes the center channel and one or more other channels. An ambience bed reference frame is aligned with a horizontal plane of a headset reference frame, such that the ambience bed is horizontally level with a user's ears. A first estimated gravity direction is fixed (made constant) in the ambience bed reference frame. During head pose tracking, the ambience bed reference frame is rolled about the boresight vector to align a second estimated gravity direction in the headset reference frame with the first estimated gravity direction fixed in the ambience bed reference frame.

12 Claims, 12 Drawing Sheets

(56) References Cited

U.S. PATENT DOCUMENTS

| | | |
|---|---|---|
| 2018/0220253 A1 | 8/2018 | Kärkkäinen et al. |
| 2019/0313201 A1 | 10/2019 | Torres et al. |
| 2019/0379995 A1* | 12/2019 | Lee .................. H04S 7/304 |
| 2020/0037097 A1 | 1/2020 | Torres et al. |
| 2020/0059749 A1 | 2/2020 | Casimiro Ericsson et al. |
| 2020/0169828 A1 | 5/2020 | Liu et al. |
| 2021/0211825 A1 | 7/2021 | Joyner et al. |

* cited by examiner

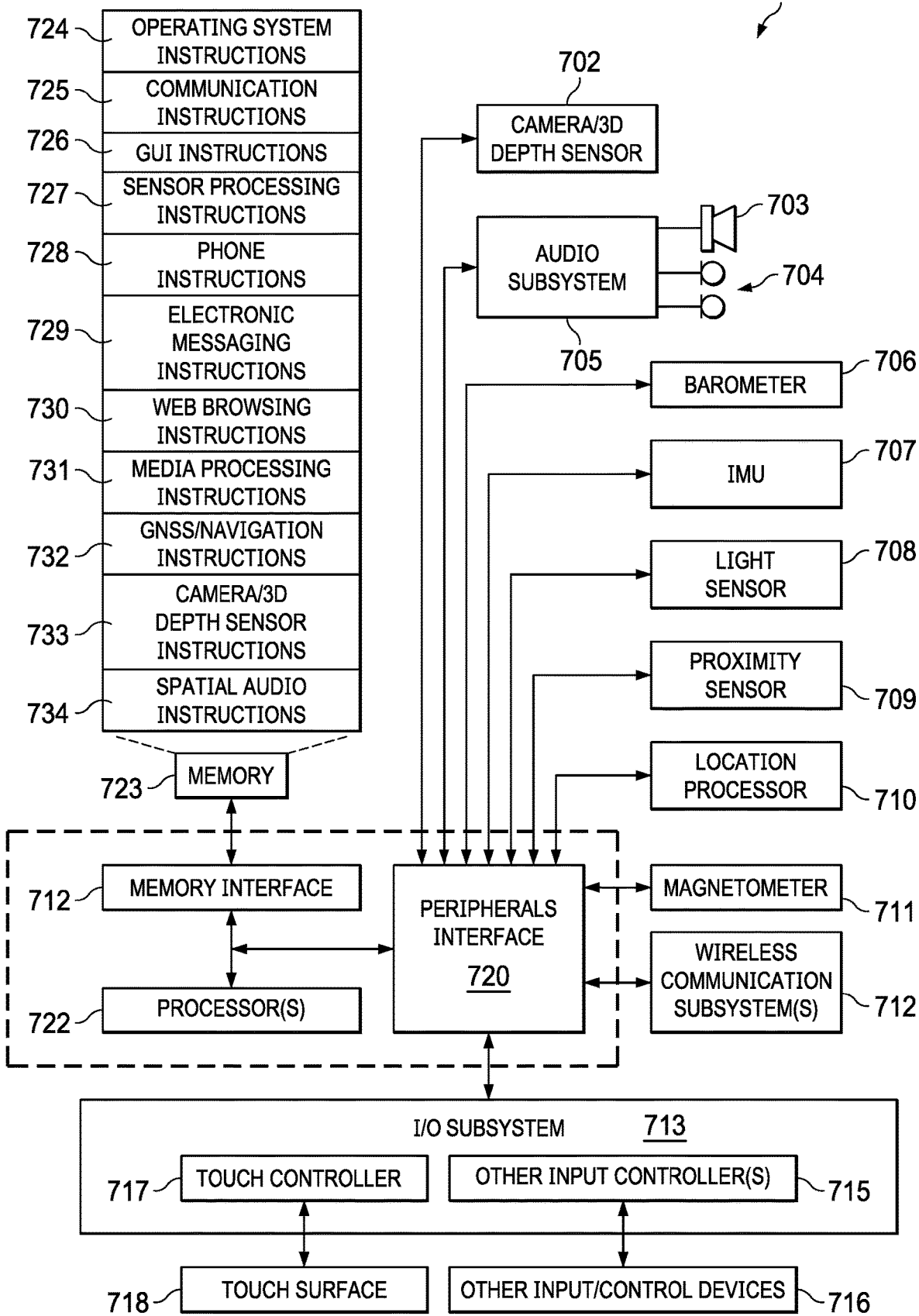

ing a movie, playing a video game or interacting with augmented reality (AR) content displayed on a source device (e.g., a computer screen). Some existing spatial audio platforms include a head pose tracker that uses a video camera to track the head pose of the user. Other existing spatial audio platforms use a single inertial measurement unit (IMU) in the headset for head pose tracking. If the source device is a mobile device (e.g., smartphone, tablet computer), then the source device and the headset are free to move relative to each other, which may adversely impact the user's perception of the 3D spatial audio. For example, in platforms that rely on a single IMU the audio would swivel off-center in cases such as movie-watching on a bus or plane that is turning, since it appears to the single headset IMU tracking solution that the user is turning their head.

INERTIALLY STABLE VIRTUAL AUDITORY SPACE FOR SPATIAL AUDIO APPLICATIONS

CROSS-REFERENCE TO RELATED APPLICATION

This application claims priority to U.S. Provisional Patent Application No. 63/041,898, filed Jun. 20, 2020, the entire contents of which are incorporated herein by reference.

TECHNICAL FIELD

This disclosure relates generally to spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content displayed on a source device (e.g., a computer screen). Some existing spatial audio platforms include a head pose tracker that uses a video camera to track the head pose of the user. Other existing spatial audio platforms use a single inertial measurement unit (IMU) in the headset for head pose tracking. If the source device is a mobile device (e.g., smartphone, tablet computer), then the source device and the headset are free to move relative to each other, which may adversely impact the user's perception of the 3D spatial audio. For example, in platforms that rely on a single IMU the audio would swivel off-center in cases such as movie-watching on a bus or plane that is turning, since it appears to the single headset IMU tracking solution that the user is turning their head.

SUMMARY

Embodiments are disclosed for an inertially stable virtual auditory space for spatial audio applications.

In an embodiment, a method comprises: during an initialization step of a head pose tracker for a spatial audio system that includes a source device and a headset coupled to the source device, a spatial audio ambience bed is rotated about a boresight vector to align the boresight vector with a center channel of the ambience bed. The boresight is computed using source device motion data and headset motion data. The ambience bed includes the center channel and one or more other channels. During the initialization step, an ambience bed reference frame is aligned with a horizontal plane of the user's head reference frame, such that the ambience bed is horizontally level with the user's ears. A first estimated gravity direction is fixed (made constant) in the ambience bed reference frame. During a head pose tracking step, the ambience bed reference frame is rolled about the boresight vector to align a second estimated gravity direction in the user's head reference frame with the first estimated gravity direction fixed in the ambience bed reference frame during initialization.

In an embodiment, the center channel and the one or more other channels are located in a common plane of the ambience bed.

In an embodiment, the ambience bed is configured for a 5.1 audio format.

In an embodiment, the source device is a mobile device that presents visual content synchronized with spatial audio played through the center channel and the one or more other channels of the ambience bed in the three-dimensional virtual auditory space.

In an embodiment, the estimated boresight vector determines an orientation of the ambience bed, and the ambience bed determines locations of audio channels around the user, such that when the center channel of the ambience bed is aligned with the boresight vector the center channel is rendered at an estimated location of source device.

In an embodiment, the first or second estimated gravity directions are computed by: determining a gravity direction using acceleration measurements output by an accelerometer of the source device, wherein the gravity direction is determined during a stationary or quiescence time interval when the source device is not moving; computing a specific force vector based on an average of the acceleration measurements; determining a reference gravity direction based on the specific force vector; predicting an attitude of the source device based on a rotation rate of the source device and the reference gravity direction, wherein the rotation rate is output by an angular rate sensor of the source device; and estimating the first or second gravity directions by rotating the determined gravity direction into an inertial reference frame using the predicted attitude of the source device.

In an embodiment, a system comprises: one or more processors; memory storing instructions that when executed by the one or more processors, cause the one or more processors to perform operations comprising: during an initialization of a head pose tracker for a spatial audio system that includes a source device and a headset coupled to the source device: rotating a spatial audio ambience bed in a three-dimensional virtual auditory space about a boresight vector to align a boresight vector with a center channel of the ambience bed, and to align an ambience bed reference frame with a horizontal plane of a headset reference frame, such that the ambience bed is horizontally level with a user's ears, and fixing a first estimated gravity direction in the ambience bed reference frame; and during head pose tracking: rolling the ambience bed reference frame about the boresight to align a second estimated gravity direction in the headset reference frame with the first estimated gravity direction fixed in the ambience bed reference frame, wherein the boresight is estimated using source device motion data and headset motion data, and the ambience bed includes the center channel and one or more other channels.

Other embodiments can include an apparatus, computing device and non-transitory, computer-readable storage medium.

Particular embodiments disclosed herein provide one or more of the following advantages. The relative motion (e.g., position and attitude) between a source device and a headset is tracked using motion data from both the source device and the headset to compensate for the motion of an externally moving global reference frame. Additionally, during head pose tracking an audio ambience bed including a center channel and other channels (e.g., L/R, L/R-S) is rolled about a boresight vector, so that an estimated gravity vector in a headset frame is aligned with estimated gravity vector fixed to an ambience bed reference frame during initialization of a head pose tracker. Without this alignment, a user would perceive virtual audio sources on one side of the ambience bed to be higher than virtual audio sources on the opposite side of the ambience bend when the user tilts their head.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 7 is a conceptual block diagram of a source device software/hardware architecture implementing the features and operations described in reference to FIGS. 1-6.

DETAILED DESCRIPTION

Example Systems

Figure 1:
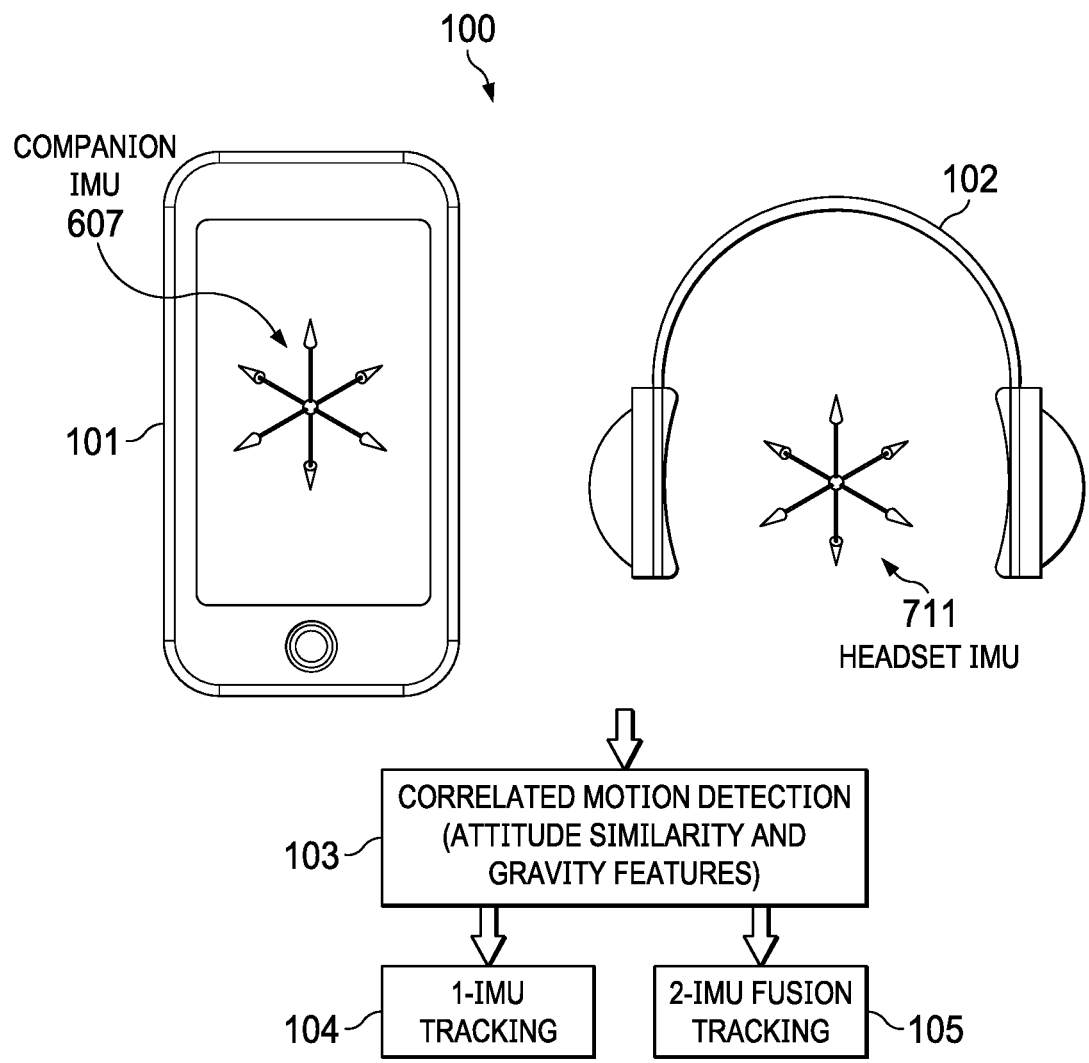
FIG. 1 illustrates an example user posture change scenario, according to an embodiment.

FIG. 1 is a conceptual diagram illustrating the use of correlated motion to select a motion tracking state, according to an embodiment. In the example scenario shown, a user is viewing audio/visual (AV) content displayed on source device 101 while wearing headset 102 that is wired or wirelessly coupled to source device 101.

Source device 101 includes any device capable of playing AV content and can be wired or wirelessly coupled to headset 102, including but not limited to a smartphone, tablet computer, laptop computer, wearable computer, game console, television, etc. In an embodiment, source device 101 includes the architecture 700 described in reference to FIG. 7. The architecture 600 includes inertial measurement unit (IMU) 707 that includes various motion sensors, including but not limited to angular rate sensors (e.g., 3-axis MEMS gyro) and accelerometers (e.g., 3-axis MEMS accelerometer). When source device 103 is moved or rotated, the motion sensors detect the motion. The outputs of IMU 707 are processed into rotation and acceleration data in an inertial reference frame. In an embodiment, source device 101 outputs AV content, including but not limited to augmented reality (AR), virtual reality (VR) and immersive video content. Source device 101 also includes an audio rendering engine (e.g., a binaural rendering engine) that simulates the main audio cues humans use to localize sounds including interaural time differences, interaural level differences, and spectral filtering done by the outer ears.

Headset 102 is any device that includes loudspeakers for projecting acoustic audio, including but not limited to: headsets, earbuds, ear phones and loudspeakers (e.g., smart speakers). In an embodiment, headset 102 includes the architecture 800 described in reference to FIG. 8. The architecture includes IMU 811 that includes various motion sensors, including but not limited to angular rate sensors (e.g., 3-axis MEMS gyro) and accelerometers (e.g., 3-axis MEMS accelerometer). When the user translates or rotates her head, the motion sensors in IMU 811 detect the motion. The outputs of the headset motion sensors are processed into rotation and acceleration data in the same inertial reference frame as the rotation and acceleration output by IMU 607 of source device 101.

In an embodiment, the headset motion data is transmitted to source device 101 over a short-range wireless communication channel (e.g., a Bluetooth channel). At source device 101, correlation motion detector 103 determines similarities (e.g., similar attitude and gravity features) between the headset motion data and the source device motion data. If the headset data and source device motion data are determined to not be correlated, a head tracker is transitioned into a 1-IMU tracking state 104, where head tracking is performed using only the headset motion data. If the headset motion data and the source device motion data are determined to be correlated, the head tracker is transitioned into a 2-IMU fusion tracking state 105, where head tracking is performed using relative motion data computed from the headset motion data and source device motion data. In the 2-IMU fusion tracking state 105, the relative position and relative attitude is computed using a relative motion model and extended Kalman filter, as described in Appendix A. The estimated relative motion (a boresight vector) is used by a head tracker to track the user's head pose and keep the spatial audio centered and inertially stable, as described in reference to FIGS. 3-5. The boresight vector estimate is updated each time the relative motion changes, and thus may cause the virtual auditory space to become uncentered. Because the estimated boresight vector is subject to drift error, the boresight vector needs to be corrected periodically or in response to trigger event (e.g., a large user posture change), as described in Appendix A.

Figure 2:
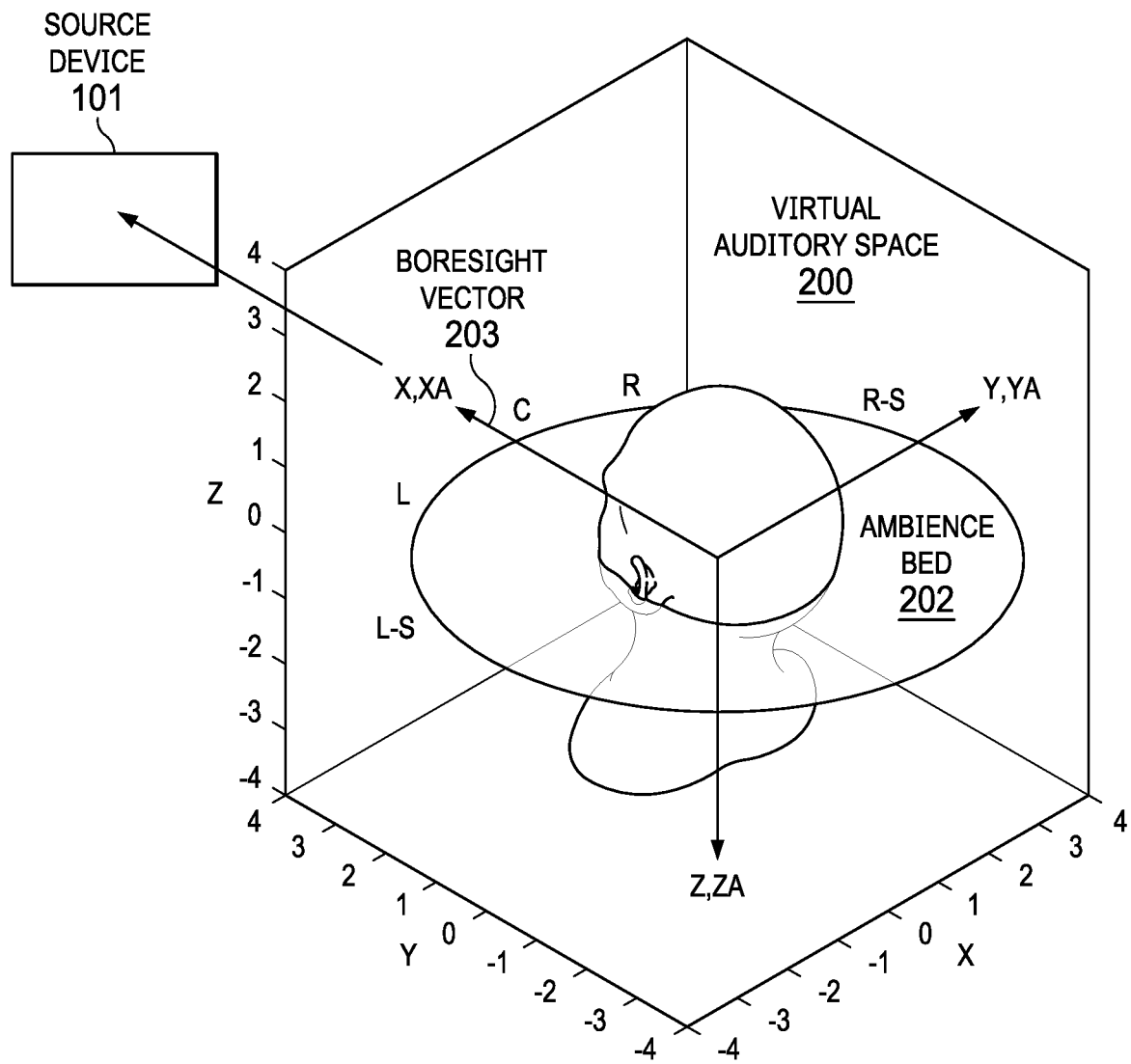
FIG. 2 illustrates a centered and inertially stabilized 3D virtual auditory space, according to an embodiment.

FIG. 2 illustrates a centered and inertially stabilized 3D virtual auditory space 200, according to an embodiment. The virtual auditory space 200 includes virtual sound sources or "virtual speakers" (e.g., center (C), Left (L), Right (R), left-surround (L-S) and right-surround (R-S)) that are rendered in ambience bed 202 using known spatial audio techniques, such as binaural rendering. To maintain the desired 3D spatial audio effect, it is desired that the center channel (C) be aligned with a boresight vector 203. The boresight vector 203 originates from a headset reference frame and terminates at a source device reference frame. When the virtual auditory environment is first initialized, the center channel is aligned with boresight vector 203 by rotating a reference frame for the ambience bed 202 ($X_A$, $Y_A$, $Z_A$) to align the center channel with boresight vector 203, as shown in FIG. 2.

This alignment process causes the spatial audio to be "centered." When the spatial audio is centered, the user perceives audio from the center channel (e.g., spoken dialogue) as coming directly from the display of source device 101. The centering is accomplished by tracking boresight vector 203 to the location of source device 101 from the head reference frame using an extended Kalman filter (EKF) tracking system, as described in Appendix A. Estimated boresight vector 203 only determines the location of the center channel. A second tracker takes as input the estimated boresight vector 203 and provides an output orientation of ambience bed 202, which determines the location of the L/L-S and R/R-S surround channels around the user in addition to the center channel. Aligning the center channel of ambience bed 202 with boresight vector 203 allows rendering the center channel at the estimated location of source device 101 for the user's perception.

If boresight vector 203 is not centered on source device 101 (e.g., due to tracking error), then aligning the center channel of ambience bed 202 will not "center" the audio, since the center channel will still be rendered at the erroneous estimate of the location of source device 101. Note that boresight vector 203 changes whenever the user's head rotates with respect to source device 101, such as when source device 101 is stationary in front of the user and the user's head is rotating. In this case, the motion of the user's head is accurately tracked as the head rotates, so that even when boresight vector 203 changes, the audio stays centered on the estimated location of source device 101 because the EKF is providing accurate tracking of how the true boresight vector 203 is changing. Also note that spatial audio becomes uncentered when the estimated boresight vector 203 is not the true location of source device 101 due to tracking error, which may come from drift over time, such as IMU propagation errors from gyro bias, etc., or other sources of error. In an embodiment, the tracking error is corrected using a bleed-to-zero (BTZ) process when the user is quiescent or a complex transition is detected, as described in Appendix A.

Note that ambience bed 202 shown in FIG. 2 is for a 5.1 audio format, where all audio channels are located in an $X_A Y_A$ plane of ambience bed 202 ($Z_A=0$), where $X_A$ is forward towards the center channel, $Y_A$ is right and $Z_A$ is down. Other embodiments, can have more or fewer audio channels, and the audio channels can be placed at different locations in the 3D virtual auditory space arbitrarily in any plane.

Figure 3:
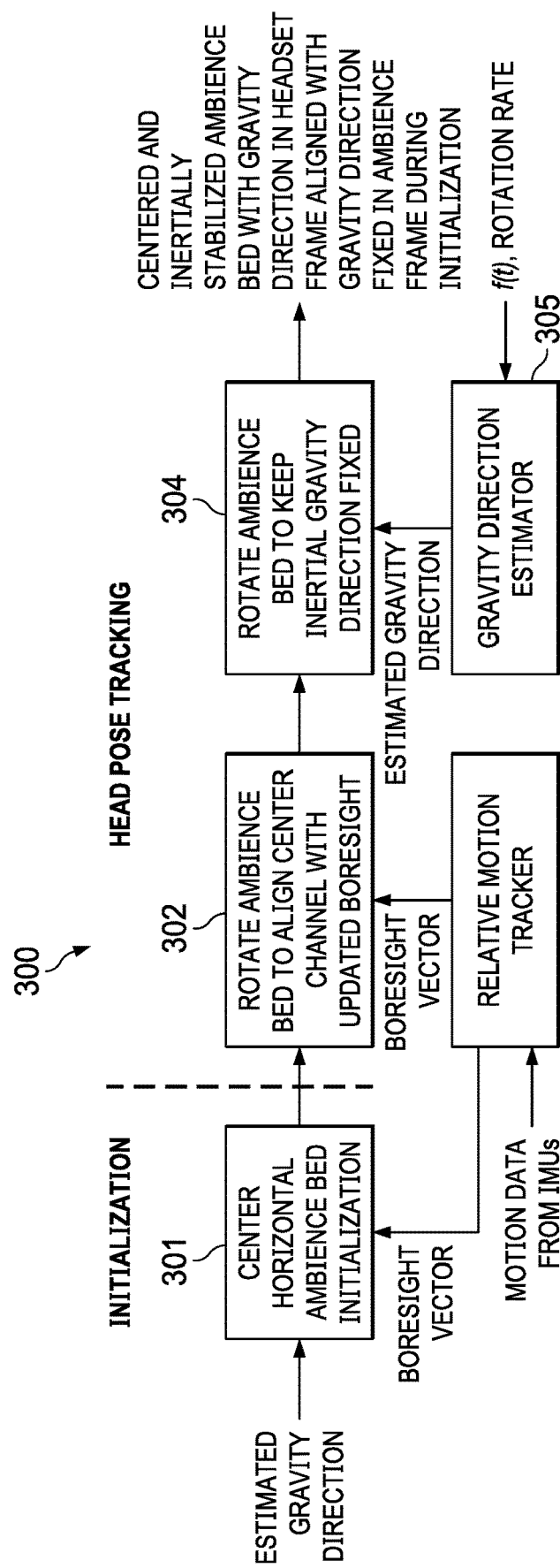
FIG. 3 is a block diagram of system for centering and inertially stabilizing a virtual auditory space, according to an embodiment.

FIG. 3 is a block diagram of system 300 for centering and inertially stabilizing a 3D virtual auditory space, according to an embodiment. System 300 includes initialization module 301, center alignment module 302 and stabilizer module 304. Relative motion tracker 303 provides an estimated boresight vector to modules 301, 302. Gravity direction estimator 305 provides an estimated gravity direction to modules 301, 304.

During initialization, initialization module 301 uses an the estimated gravity direction and boresight vector 203 to constrain the right side of ambience bed 202 (see FIG. 2) to lie within the XY horizontal plane of the user's head (in the plane through the user's ears). Relative motion tracker 303 estimates boresight vector 203 in a headset sensor reference frame using an extended Kalman filter, as described in Appendix A. Gravity direction estimator 305 estimates a gravity direction based on acceleration data from an accelerometer of source device 101, as described in reference to FIG. 4.

During head pose tracking, center alignment module 302 rotates ambience bed 202 to align with the center channel using an updated boresight vector 203. Stabilizer module 304 uses the estimated gravity vector to rotate (e.g., rolls) ambience bed 202 about boresight vector 203 to align the estimated gravity direction in the user's head reference frame with the gravity direction fixed in the ambience bed 202 reference frame during initialization.

Figure 4:
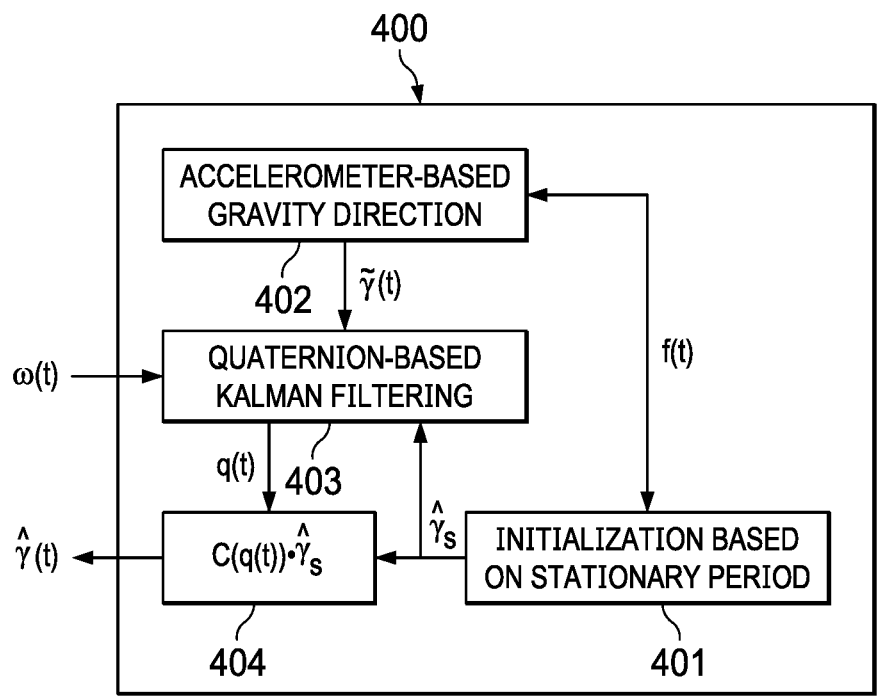
FIG. 4 is a block diagram of a system for estimating gravity direction using sensor data, according to an embodiment.

FIG. 4 is a flow diagram of process 400 for estimating gravity direction using sensor data, according to an embodiment. Process 400 can be implemented using, for example, the source device architecture shown in FIG. 7.

Process 400 begins by initializing an accelerometer-based gravity direction (402). For example, during a stationary or quiescence time interval when source device 101 is not moving an average specific force vector $f_{ave}(t)$ is computed by averaging accelerometer measurements (axis-wise) in that time interval. Then the reference gravity direction in a stationary sensor frame is computed using Equation [1]:

$$\tilde{\gamma}(t) = \frac{-f_{ave}(t)}{\|f_{ave}(t)\|}. \qquad [1]$$

Process 400 continues by predicting an attitude of the source device using the accelerometer-based gravity direction (403). For example, a quaternion-based Kalman filter can be used to predict an attitude quaternion q(t) representing the attitude of the source device using rotation rate ω(t) from a 3-axis MEMS gyro and the reference gravity direction $\tilde{\gamma}(t)$.

Process 400 continues by estimating the gravity direction by rotating the accelerometer-based gravity direction into an inertial reference frame using the predicted attitude of the source device (404) and Equation [2]:

$$\hat{\gamma}(t) = C(q(t)) \cdot \tilde{\gamma}(t), \qquad [2]$$

where C(q(t)) is given by Equation [3], $I_3$ is 3×3 identity matrix and $q(t)=[q_v^T, q_c]^T$, and where $q_v$ is the vector part of the q(t) and $q_c$ is the scaler part of q(t):

$$C(q(t)) = (q_c^2 - q_v^T q_v) I_3 - 2 q_c |q_v x| + 2 q_v q_v^T. \qquad [3]$$

The estimated gravity direction $\hat{\gamma}(t)$ is then used to stabilize the virtual auditory space, as described in reference to FIG. 2.

FIGS. 5A-5D illustrate how an ambience bed is inertially stabilized when the user tilts their head, according to an embodiment.

Figure 5A:
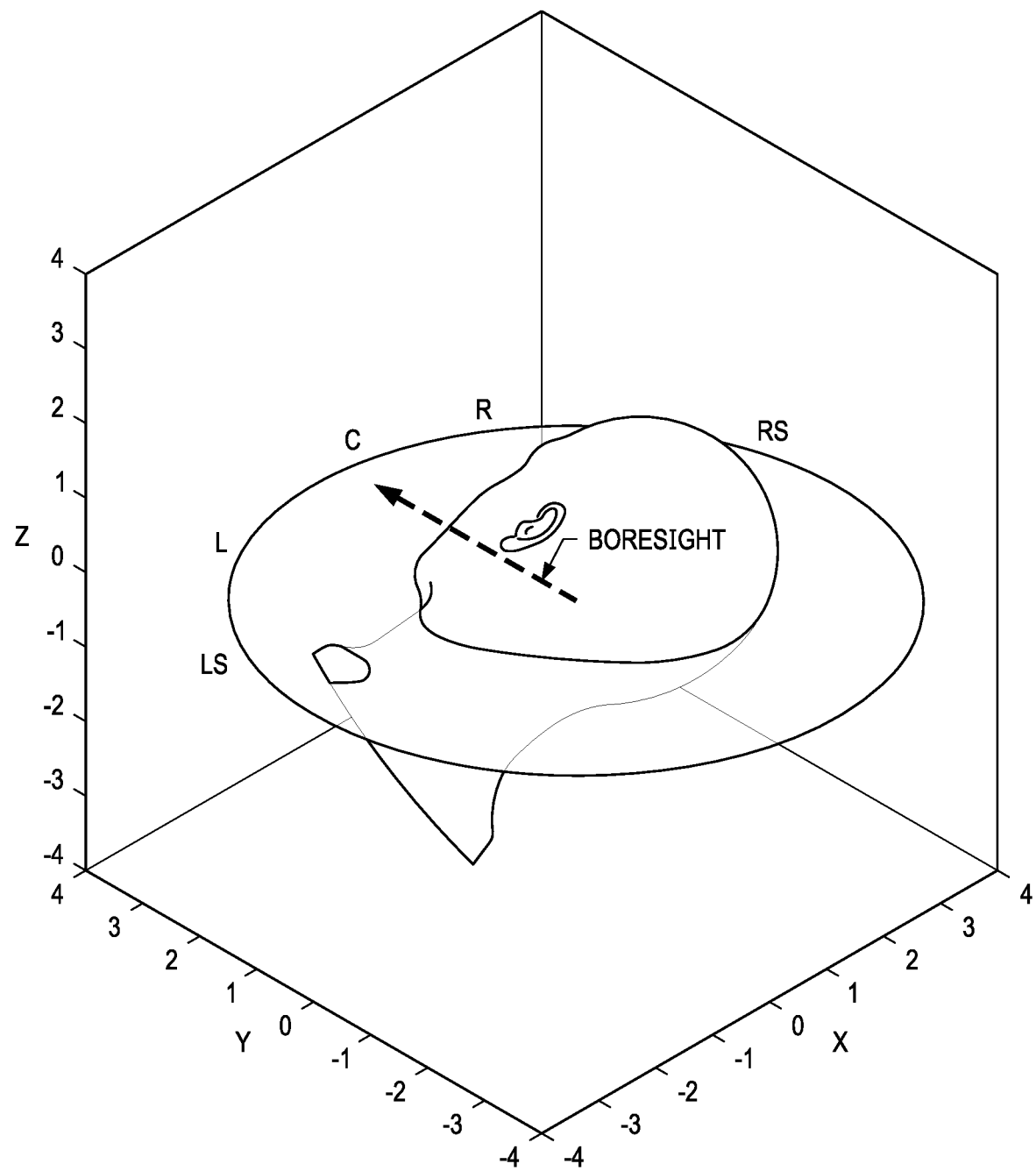
FIGS. 5A-5D illustrate how an ambience bed is inertially stabilized when the user tilters their head, according to an embodiment.

FIG. 5A illustrates a user tilting their head to the right with the boresight vector aligned with the center channel (C) of the ambience bed. With the center channel aligned with the boresight vector, the ambience bed roll angle is defined about the boresight vector to place the L/R and L/R-S channels in the ambience bed so that the channels are horizontally level with the user's ears at initialization.

Figure 5B:
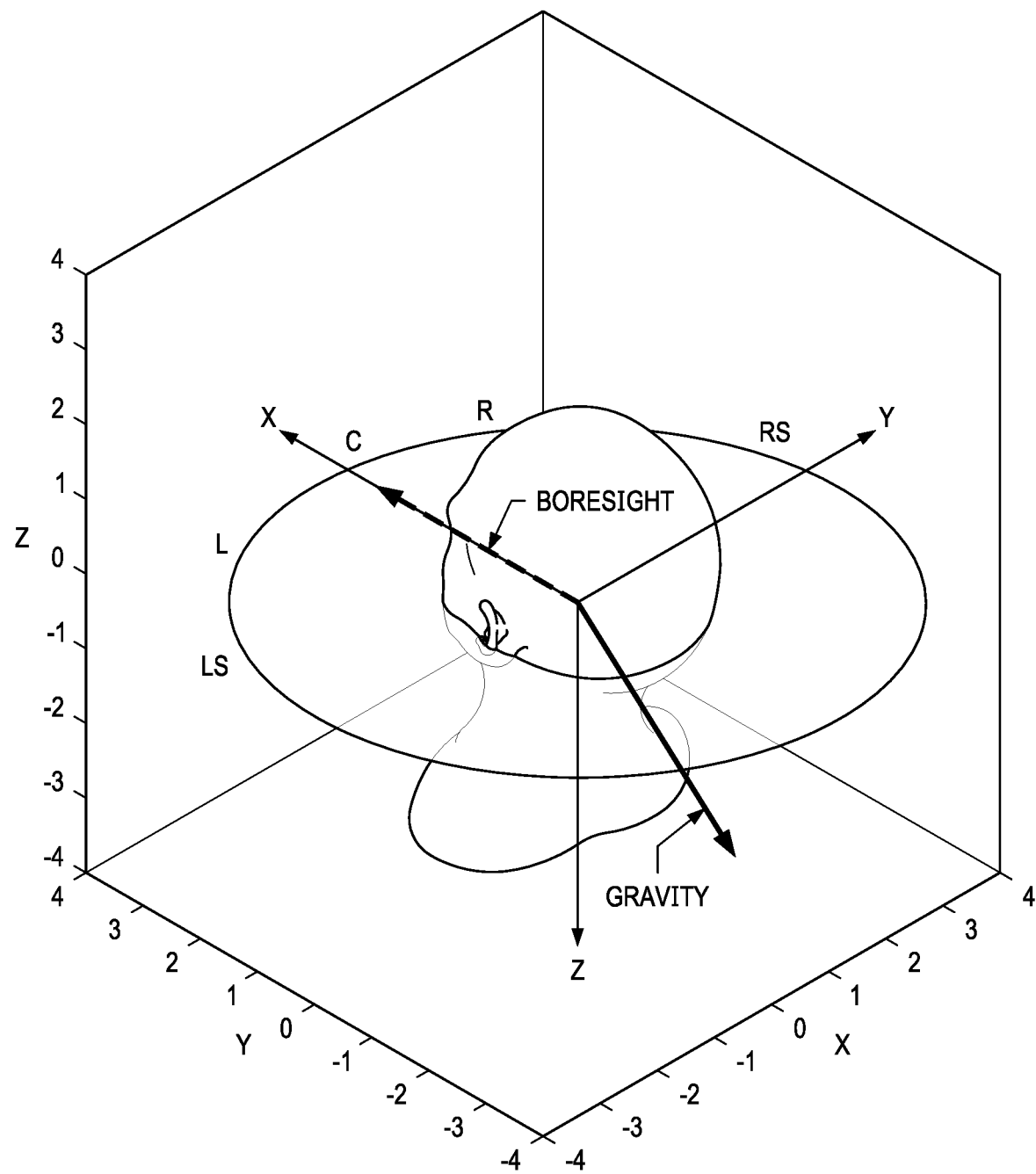

FIG. 5B illustrates the user in a forward facing viewing position. The right side of the ambience bed is shown aligned to the user's right ear because the boresight vector is directly in front of the user along the +X direction. If the boresight vector is off to one side, the right side of the ambience bed would be aligned to lie in the horizontal plane of the user's ears. The inertial gravity direction is shown fixed in the ambience bed reference frame.

Figure 5C:
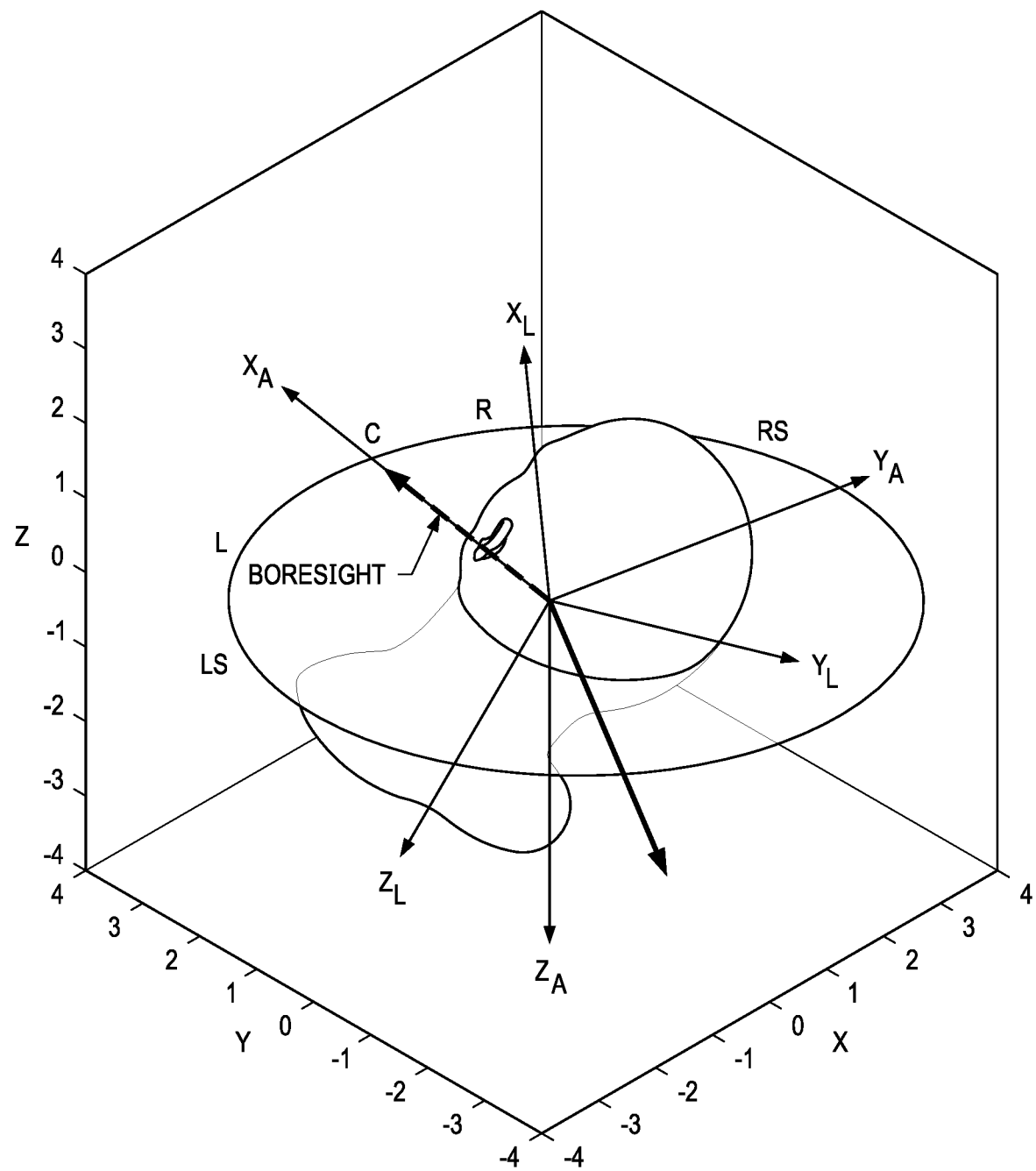

FIG. 5C illustrates the ambience bed reference frame ($X_A$, $Y_A$, $Z_A$), and a headset reference frame ($X_L$, $Y_L$, $Z_L$). The YZ gravity direction is constant to avoid violating the boresight vector constraint, where the boresight must always be aligned with the center channel of the ambience bed.

Figure 5D:
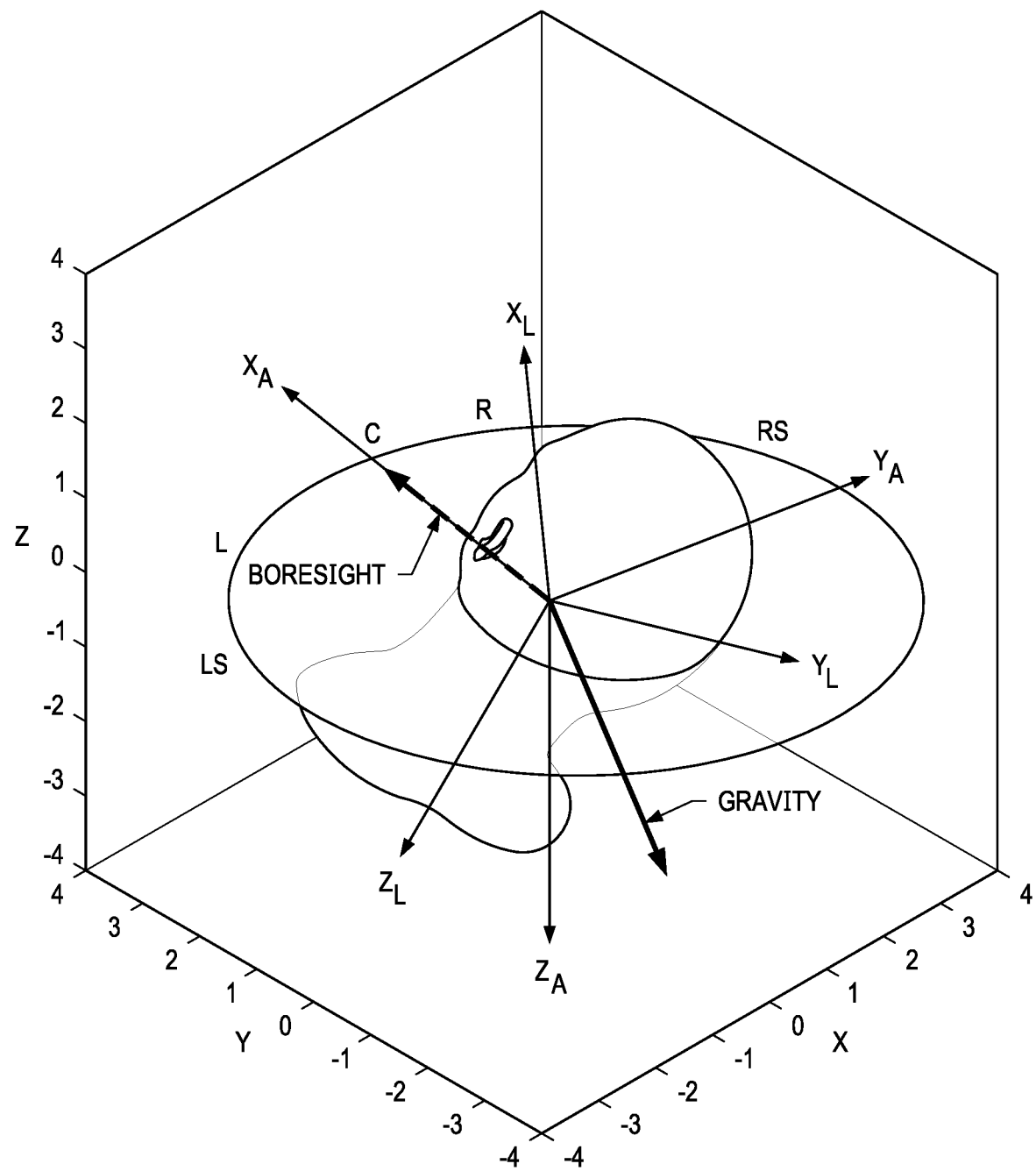

FIG. 5D illustrates the ambience bed reference frame ($X_A$, $Y_A$, $Z_A$), the headset reference frame ($X_L$, $Y_L$, $Z_L$), and the inertial gravity vector fixed in the ambience bed. To position the L, R, LS and RS channels, the roll of the ambience bed is constrained. On initialization, the ambience bed is rolled about the boresight vector to align YA of the ambience bed reference frame with the horizontal $X_L Y_L$ plane of the headset frame such that the ambience bed is horizontally level with the user's ears. During tracking, the ambience bed is rolled about the boresight vector to align the current gravity direction estimate in the headset reference frame with the gravity direction fixed in the ambience bed reference frame during initialization.

Figure 6:
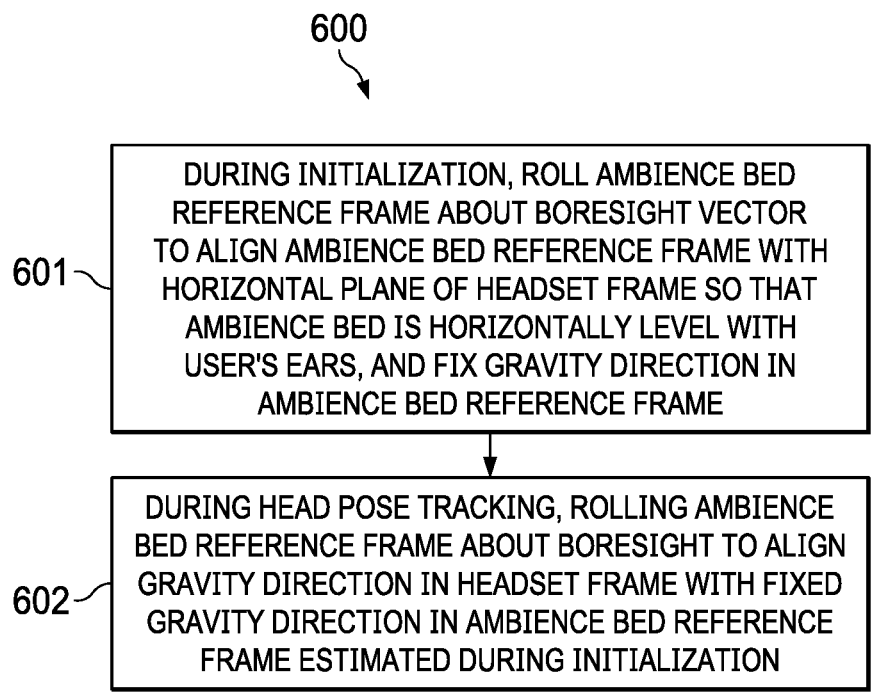
FIG. 6 is a flow diagram of process of centering and inertially stabilizing a virtual auditory space, according to an embodiment.

FIG. 6 is a flow diagram of process 600 of centering and inertially stabilizing a virtual auditory space, according to an embodiment. Process 600 can be implemented using, for example, the source device architecture shown in FIG. 7.

During a head pose tracker initialization step 601, a spatial audio ambience bed is rotated about a boresight vector to align a boresight vector with a center channel of the ambience bed, and to align an ambience bed reference frame with a horizontal plane of a headset reference frame, such that the ambience bed is horizontally level with a user's ears, and fixing a first estimated gravity direction in the ambience bed reference frame.

During a head pose tracking step 602, the ambience bed reference frame is rolled about the boresight to align a second estimated gravity direction in the headset reference frame with the first estimated gravity direction fixed in the ambience bed reference frame, wherein the boresight is computed using source device motion data and headset motion data, and the ambience bed includes the center channel and one or more other channels.

Example Software/Hardware Architectures

FIG. 7 is a conceptual block diagram of source device software/hardware architecture 700 implementing the features and operations described in reference to FIGS. 1-6. Architecture 700 can include memory interface 721, one or more data processors, digital signal processors (DSPs), image processors and/or central processing units (CPUs) 722 and peripherals interface 720. Memory interface 721, one or more processors 722 and/or peripherals interface 720 can be separate components or can be integrated in one or more integrated circuits.

Sensors, devices and subsystems can be coupled to peripherals interface 720 to provide multiple functionalities. For example, IMU 707, light sensor 708 and proximity sensor 709 can be coupled to peripherals interface 720 to facilitate motion sensing (e.g., acceleration, rotation rates), lighting and proximity functions of the wearable computer. Location processor 710 can be connected to peripherals interface 720 to provide geo-positioning. In some implementations, location processor 710 can be a GNSS receiver, such as the Global Positioning System (GPS) receiver. Electronic magnetometer 711 (e.g., an integrated circuit chip) can also be connected to peripherals interface 720 to provide data that can be used to determine the direction of magnetic North. Electronic magnetometer 711 can provide data to an electronic compass application. IMU 707 can include one or more accelerometers and/or gyros (e.g., 3-axis MEMS accelerometer and 3-axis MEMS gyro) configured to determine change of speed and direction of movement of the source device. Barometer 706 can be configured to measure atmospheric pressure around the mobile device.

Camera/3D depth sensor 702 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 712, which can include radio frequency (RF) receivers and transmitters (or transceivers) and/or optical (e.g., infrared) receivers and transmitters. The specific design and implementation of the wireless communication subsystem 712 can depend on the communication network(s) over which a mobile device is intended to operate. For example, architecture 700 can include communication subsystems 712 designed to operate over a GSM network, a GPRS network, an EDGE network, a Wi-Fi™ network and a Bluetooth™ network. In particular, the wireless communication subsystems 712 can include hosting protocols, such that the mobile device can be configured as a base station for other wireless devices.

Audio subsystem 705 can be coupled to a speaker 703 and one or more microphones 704 to facilitate voice-enabled functions, such as voice recognition, voice replication, digital recording and telephony functions. Audio subsystem 705 can be configured to receive voice commands from the user.

I/O subsystem 713 can include touch surface controller 717 and/or other input controller(s) 715. Touch surface controller 717 can be coupled to a touch surface 718. Touch surface 718 and touch surface controller 717 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 718 can include, for example, a touch screen or the digital crown of a smart watch. I/O subsystem 713 can include a haptic engine or device for providing haptic feedback (e.g., vibration) in response to commands from processor or a digital signal processor (DSP) 722. In an embodiment, touch surface 718 can be a pressure-sensitive surface.

Other input controller(s) 715 can be coupled to other input/control devices 716, such as one or more buttons, rocker switches, thumb-wheel, infrared port and USB port. The one or more buttons (not shown) can include an up/down button for volume control of speaker 703 and/or microphones 704. Touch surface 718 or other input control devices 716 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 718; and a pressing of the button for a second duration that is longer than the first duration may turn power to the mobile device on or off. The user may be able to customize a functionality of one or more of the buttons. The touch surface 718 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 721 can be coupled to memory 723. Memory 723 can include high-speed random access memory and/or non-volatile memory, such as one or more magnetic disk storage devices, one or more optical storage devices and/or flash memory (e.g., NAND, NOR). Memory 723 can store operating system 724, such as the iOS operating system developed by Apple Inc. of Cupertino, Calif. Operating system 724 may include instructions for handling basic system services and for performing hardware dependent tasks. In some implementations, operating system 724 can include a kernel (e.g., UNIX kernel).

Memory 723 may also store communication instructions 725 to facilitate communicating with one or more additional devices, one or more computers and/or one or more servers, such as, for example, instructions for implementing a software stack for wired or wireless communications with other devices. Memory 723 may include graphical user interface instructions 726 to facilitate graphic user interface processing; sensor processing instructions 727 to facilitate sensor-related processing and functions; phone instructions 728 to facilitate phone-related processes and functions; electronic messaging instructions 729 to facilitate electronic-messaging related processes and functions; web browsing instructions 730 to facilitate web browsing-related processes and functions; media processing instructions 731 to facilitate media processing-related processes and functions; GNSS/Location instructions 732 to facilitate generic GNSS and location-related processes; and camera/3D depth sensor instructions 733 for capturing images (e.g., video, still images) and depth data (e.g., a point cloud). Memory 723 further includes spatial audio instructions 734 for use in spatial audio applications, including but not limited AR and immersive video applications.

Each of the above identified instructions and applications can correspond to a set of instructions for performing one or more functions described above. These instructions need not be implemented as separate software programs, procedures, or modules. Memory 723 can include additional instructions or fewer instructions. Furthermore, various functions of the mobile device may be implemented in hardware and/or in software, including in one or more signal processing and/or application specific integrated circuits.

Figure 8:
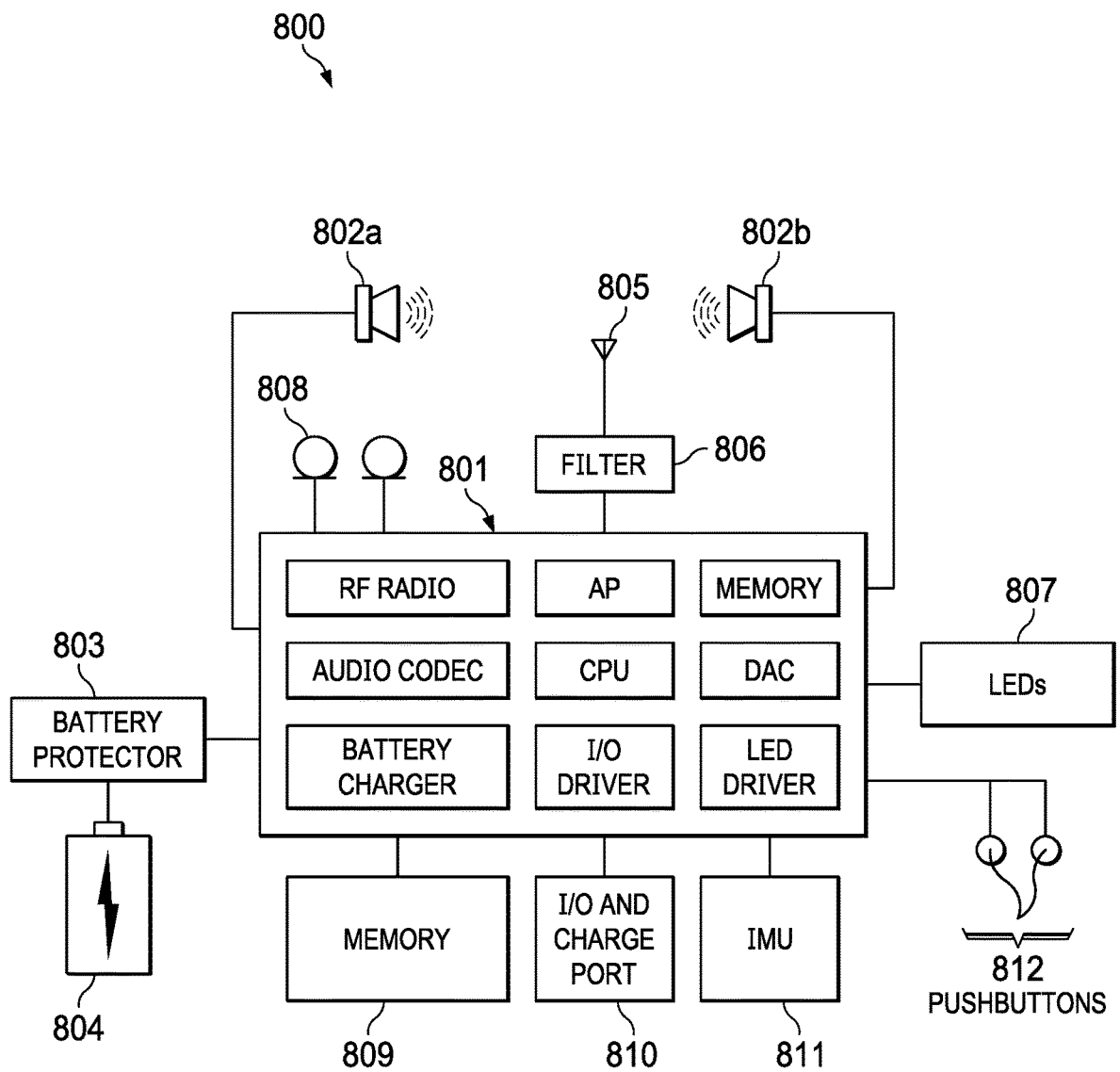
FIG. 8 is a conceptual block diagram of a headset software/hardware architecture implementing the features and operations described in reference to FIGS. 1-6.

FIG. 8 is a conceptual block diagram of headset software/hardware architecture 800 implementing the features and operations described in reference to FIGS. 1-6. In an embodiment, architecture 800 can includes system-on-chip (SoC) 801, stereo loudspeakers 802a, 802b (e.g., ear buds, headphones, ear phones), battery protector 803, rechargeable battery 804, antenna 805, filter 806, LEDs 807, microphones 808, memory 809 (e.g., flash memory), I/O/Charge port 810, IMU 811 and pushbuttons 812 for turning the headset on and off, adjusting volume, muting, etc. IMU 811 was previously described in reference to FIGS. 1-6, and includes, for example, a 3-axis MEMS gyro and a 3-axis MEMS accelerometer.

SoC 801 further includes various modules, such as a radio frequency (RF) radio (wireless transceiver) for wireless bi-directional communication with other devices, such as a source device 103, as described in reference to FIGS. 1-6. SoC 801 further includes an application processor (AP) for running specific applications, memory (e.g., flash memory), central processing unit (CPU) for managing various functions of the headsets, audio codec for encoding/decoding audio, battery charger for charging/recharging rechargeable battery 804, I/O driver for driving I/O and charge port 810 (e.g., a micro USB port), digital to analog converter (DAC) converting digital audio into analog audio and LED driver for driving LEDs 807. Other embodiments can have more or fewer components.

Figure 9:
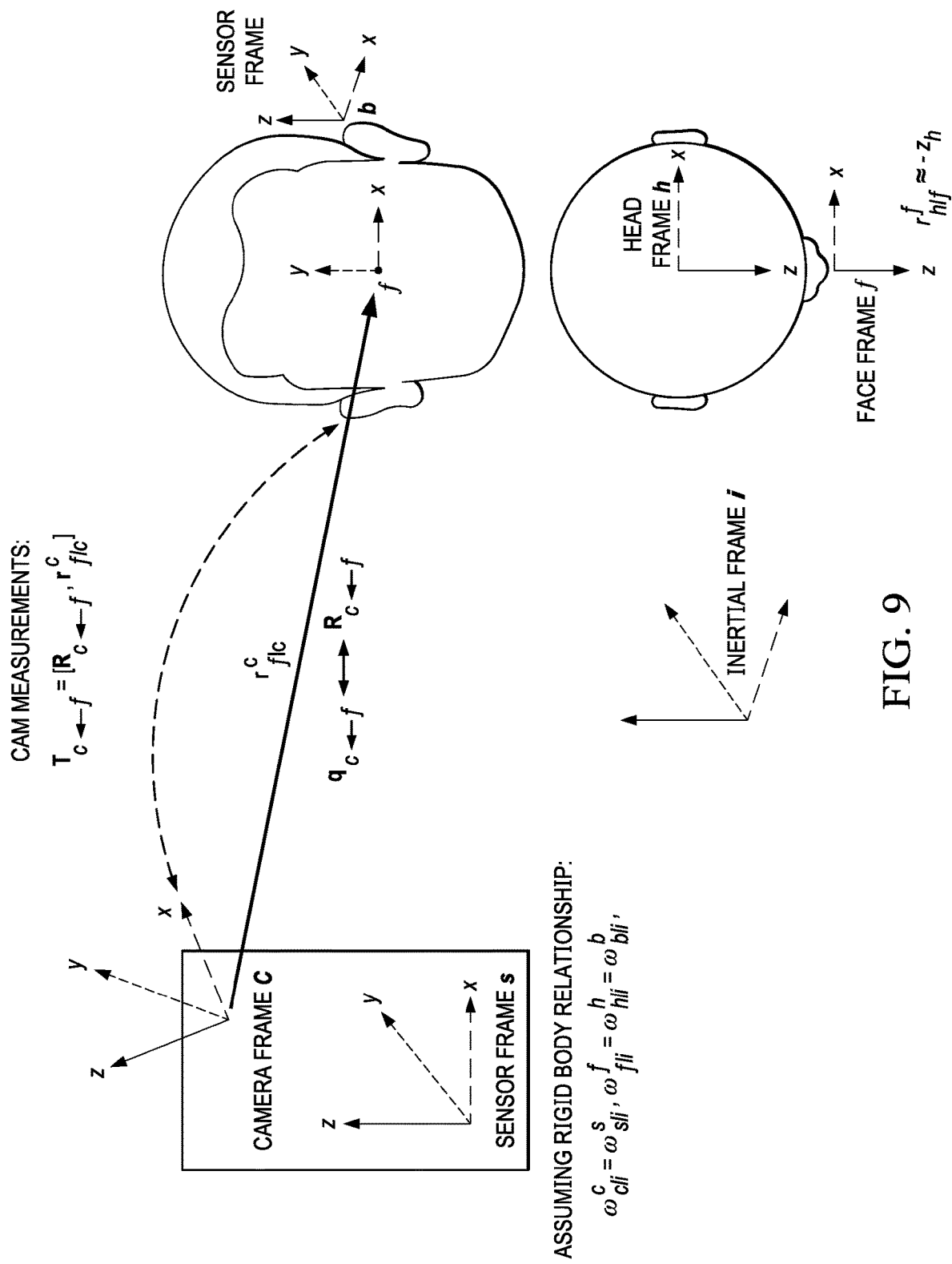
FIG. 9 illustrates various reference frames and notation for relative pose tracking, according to an embodiment.

FIG. 9 illustrates various reference frames and notation for relative pose tracking as described more fully in Appendix A attached hereto, according to an embodiment.

Figure 10:
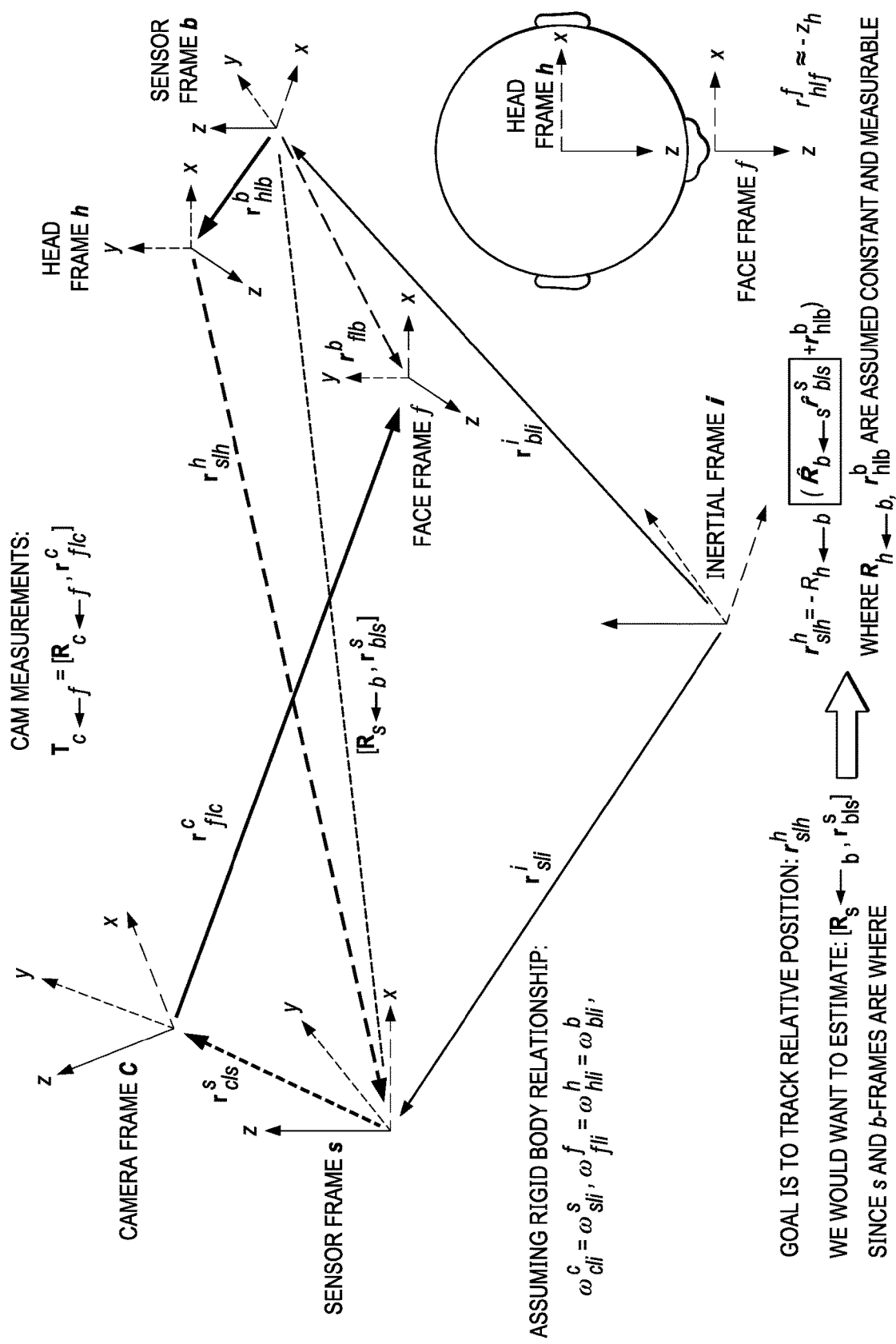
FIG. 10 illustrates the geometry for a relative motion model used in headtracking, according to an embodiment.

FIG. 10 illustrates the geometry for a relative motion model used in headtracking as described more fully in Appendix A attached hereto, according to an embodiment.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
during an initialization of a head pose tracker for a spatial audio system that includes a source device and a headset coupled to the source device:
rotating, using one or more processors, a spatial audio ambience bed in a three-dimensional virtual auditory space about a boresight vector to align the boresight vector with a center channel of the ambience bed, and to align an ambience bed reference frame with a horizontal plane of a headset reference frame, such that the ambience bed is horizontally level with a user's ears, and fixing a first estimated gravity direction in the ambience bed reference frame; and
during head pose tracking:
rolling, using the one or more processors, the ambience bed reference frame about the boresight vector to align a second estimated gravity direction in the headset reference frame with the first estimated gravity direction fixed in the ambience bed reference frame, wherein the boresight vector is estimated using source device motion data and headset motion data, and the ambience bed includes the center channel and one or more other channels.

2. The method of claim 1, wherein the center channel and the one or more other channels are located in a common plane of the ambience bed.

3. The method of claim 1, wherein the ambience bed is configured for a 5.1 audio format.

4. The method of claim 1, wherein the source device is a mobile device that presents visual content synchronized with spatial audio played through the center channel and the one or more other channels of the ambience bed in the three-dimensional virtual auditory space.

5. The method of claim 1, wherein the estimated boresight vector determines an orientation of the ambience bed, and the ambience bed determines locations of audio channels around the user, such that when the center channel of the ambience bed is aligned with the boresight vector the center channel is rendered at an estimated location of source device.

6. The method of claim 1, wherein the first or second estimated gravity directions are computed by:
determining a gravity direction using acceleration measurements output by an accelerometer of the source device, wherein the gravity direction is determined during a stationary or quiescence time interval when the source device is not moving;
computing a specific force vector based on an average of the acceleration measurements;
determining a reference gravity direction based on the specific force vector;
predicting an attitude of the source device based on a rotation rate of the source device and the reference gravity direction, wherein the rotation rate is output by an angular rate sensor of the source device; and
estimating the first or second gravity directions by rotating the determined gravity direction into an inertial reference frame using the predicted attitude of the source device.

7. A system comprising:
one or more processors;
memory storing instructions that when executed by the one or more processors, cause the one or more processors to perform operations comprising:
during an initialization of a head pose tracker for a spatial audio system that includes a source device and a headset coupled to the source device:
rotating a spatial audio ambience bed in a three-dimensional virtual auditory space about a boresight vector to align the boresight vector with a center channel of the ambience bed, and to align an ambience bed reference frame with a horizontal plane of a headset reference frame, such that the ambience bed is horizontally level with a user's ears, and fixing a first estimated gravity direction in the ambience bed reference frame; and
during head pose tracking:
rolling the ambience bed reference frame about the boresight vector to align a second estimated gravity direction in the headset reference frame with the first estimated gravity direction fixed in the ambience bed reference frame, wherein the boresight vector is estimated using source device motion data and headset motion data, and the ambience bed includes the center channel and one or more other channels.

8. The system of claim 7, wherein the center channel and the one or more other channels are located in a common plane of the ambience bed.

9. The system of claim 7, wherein the ambience bed is configured for a 5.1 audio format.

10. The system of claim 7, wherein the source device is a mobile device that presents visual content synchronized with spatial audio played through the center channel and the one or more other channels of the ambience bed in the three-dimensional virtual auditory space.

11. The system of claim 7, wherein the estimated boresight vector determines an orientation of the ambience bed, and the ambience bed determines locations of audio channels around the user, such that when the center channel of the ambience bed is aligned with the boresight vector the center channel is rendered at an estimated location of source device.

12. The system of claim 7, wherein the first or second estimated gravity directions are computed by:
determining a gravity direction using acceleration measurements output by an accelerometer of the source device, wherein the gravity direction is determined during a stationary or quiescence time interval when the source device is not moving;

computing a specific force vector based on an average of the acceleration measurements;

determining a reference gravity direction based on the specific force vector;

predicting an attitude of the source device based on a rotation rate of the source device and the reference gravity direction, wherein the rotation rate is output by an angular rate sensor of the source device; and estimating the first or second gravity directions by rotating the determined gravity direction into an inertial reference frame using the predicted attitude of the source device.

* * * * *